US009294878B2

(12) United States Patent
Tian et al.

(10) Patent No.: US 9,294,878 B2
(45) Date of Patent: Mar. 22, 2016

(54) METHOD AND APPARATUS FOR PROVIDING HUB-BASED INDEXING AND SERVICES

(75) Inventors: Jilei Tian, Beijing (CN); Huanhuan Cao, Beijing (CN); Zhen Liu, Tarrytown, NY (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/379,976

(22) PCT Filed: Feb. 29, 2012

(86) PCT No.: PCT/CN2012/071796
§ 371 (c)(1),
(2), (4) Date: Aug. 20, 2014

(87) PCT Pub. No.: WO2013/127077
PCT Pub. Date: Sep. 6, 2013

(65) Prior Publication Data
US 2015/0031400 A1    Jan. 29, 2015

(51) Int. Cl.
*H04W 4/02* (2009.01)
*H04W 4/18* (2009.01)
(Continued)

(52) U.S. Cl.
CPC .............. *H04W 4/023* (2013.01); *H04W 4/028* (2013.01); *H04W 4/18* (2013.01); *H04L 67/20* (2013.01); *H04L 67/306* (2013.01); *H04L 67/325* (2013.01); *H04W 88/02* (2013.01)

(58) Field of Classification Search
CPC ...... H04W 4/023; H04W 4/028; H04W 88/02
USPC ....................................................... 455/456.3
See application file for complete search history.

(56) References Cited

U.S. PATENT DOCUMENTS

| 7,129,825 B2 | 10/2006 | Weber |
| 7,595,740 B2 | 9/2009 | Pechenick et al. |

(Continued)

FOREIGN PATENT DOCUMENTS

| CN | 101529834 | 9/2009 |
| CN | 101621741 | 1/2010 |

(Continued)

OTHER PUBLICATIONS

Chang et al., "Location-Aware Mobile Transportation Information Service", 2nd International Conference on Mobile Technology, Applications and Systems, Nov. 15-17, 2005, 5 pages.

(Continued)

*Primary Examiner* — Leon Flores
(74) *Attorney, Agent, or Firm* — Ditthavong & Steiner, P.C.

(57) ABSTRACT

An approach is provided for providing hub-based indexing and services. The hub-based platform causes, at least in part, an indexing of location-based content according to one or more location hubs of one or more transportation lines, Next, the hub-based platform determines a current proximity, a predicted proximity, or a combination thereof of one or more devices to the one or more location hubs, wherein the one or more devices are (a) traveling on the one or more transportation lines, (b) predicted to travel on the one or more transportation lines, or (c) a combination thereof. Then, the hub-based platform causes, at least in part, a presentation of at least a portion of the location-based content based, at least in part, on the current proximity, the predicted proximity, or a combination thereof.

19 Claims, 10 Drawing Sheets

(51) Int. Cl.
*H04L 29/08* (2006.01)
*H04W 88/02* (2009.01)

(56) References Cited

U.S. PATENT DOCUMENTS

| | | | |
|---|---|---|---|
| 7,996,019 B2 | 8/2011 | Kale et al. | |
| 8,045,455 B1 | 10/2011 | Agronow et al. | |
| 8,073,460 B1 * | 12/2011 | Scofield et al. | 455/456.1 |
| 2004/0181466 A1 | 9/2004 | Ishida et al. | |
| 2005/0171791 A1 | 8/2005 | Chimenti et al. | |
| 2006/0242009 A1 | 10/2006 | Crolley | |
| 2007/0006098 A1 * | 1/2007 | Krumm et al. | 715/825 |
| 2009/0005080 A1 * | 1/2009 | Forstall et al. | 455/456.3 |
| 2009/0070283 A1 | 3/2009 | Kang et al. | |
| 2009/0319605 A1 * | 12/2009 | Wirola et al. | 709/203 |
| 2010/0077484 A1 | 3/2010 | Paretti et al. | |
| 2010/0291907 A1 | 11/2010 | MacNaughtan et al. | |
| 2011/0071881 A1 | 3/2011 | Zheng et al. | |
| 2011/0208822 A1 | 8/2011 | Rathod | |
| 2011/0246469 A1 | 10/2011 | Yarvis et al. | |
| 2012/0004961 A1 | 1/2012 | Flynn | |

FOREIGN PATENT DOCUMENTS

| | | |
|---|---|---|
| CN | 101952845 | 1/2011 |
| WO | 02/87273 A2 | 10/2002 |
| WO | 2008-145719 A | 6/2008 |
| WO | 2009/055803 A1 | 4/2009 |

OTHER PUBLICATIONS

International Search Report received for corresponding Patent Cooperation Treaty Application No. PCT/CN2012/071796, dated Dec. 6, 2012, 3 pages.

Office Action for corresponding European Patent Application No. 12870204.0-1853, dated Aug. 28, 2015, 7 Pages.

* cited by examiner

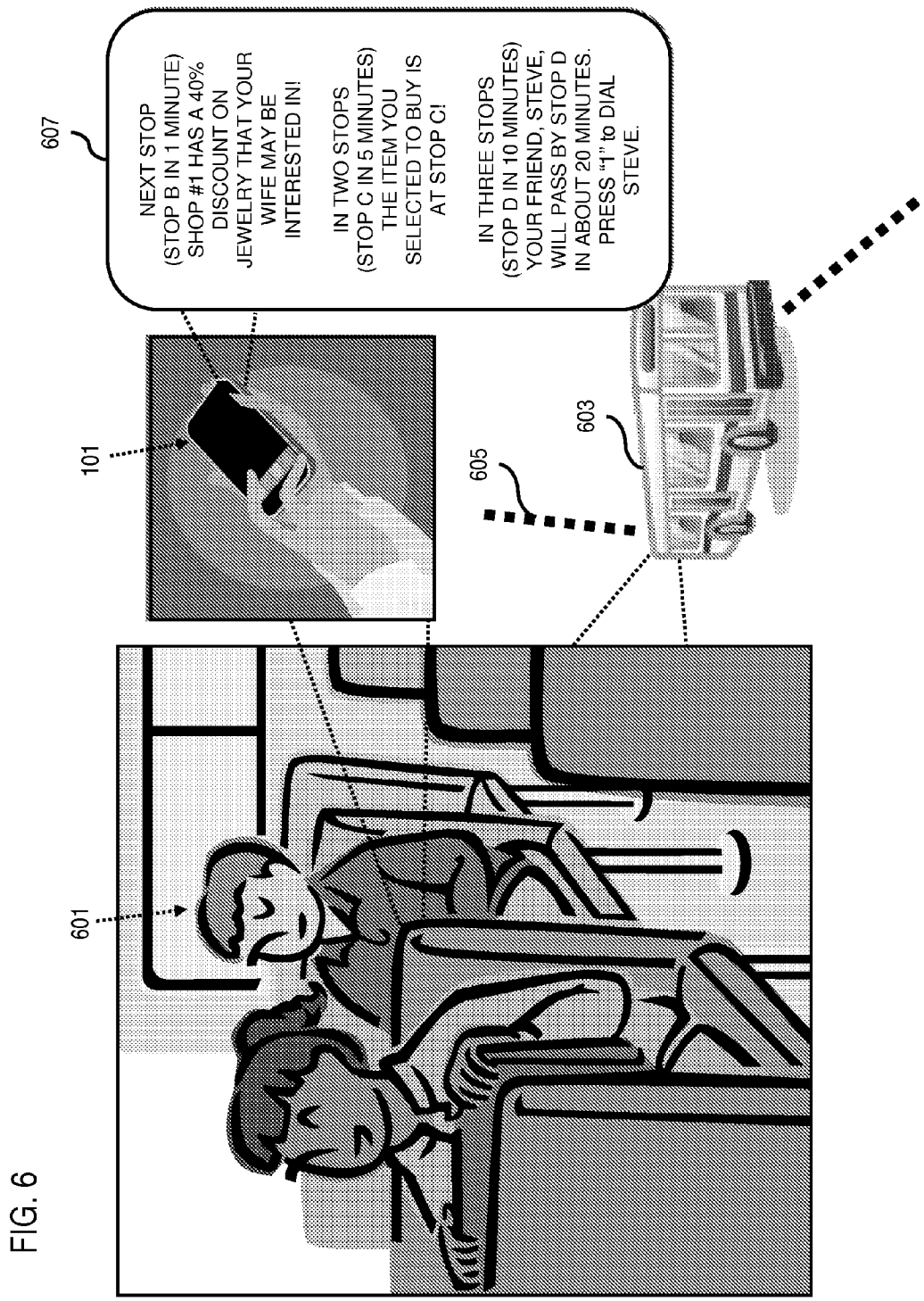

METHOD AND APPARATUS FOR PROVIDING HUB-BASED INDEXING AND SERVICES

RELATED APPLICATION

This application was originally filed as PCT Application No. PCT/CN2012/071796 filed Feb. 29, 2012.

BACKGROUND

Service providers and device manufacturers (e.g., wireless, cellular, etc.) are continually challenged to deliver value and convenience to consumers by, for example, providing compelling network services. One area of interest has been the development of location-based services and technologies. For example, service providers that offer navigation and mapping services to users may also present those users with relevant advertisements and other content that match their current location. Moreover, such services may provide relevant content to user based on a prediction of where those users might be in the near future. However, due to randomness associated with user movement, it may be difficult to determine the particular routes that the users will take, the places that the users will pass by, etc.

SOME EXAMPLE EMBODIMENTS

Therefore, there is a need for an approach for providing hub-based indexing and services, for instance, to improve user travel behavior and destination predictions, to offer more relevant content to users, etc., by introducing location hubs.

According to one embodiment, a method comprises causing, at least in part, an indexing of location-based content according to one or more location hubs of one or more transportation lines. The method also comprises determining a current proximity, a predicted proximity, or a combination thereof of one or more devices to the one or more location hubs, wherein the one or more devices are (a) traveling on the one or more transportation lines, (b) predicted to travel on the one or more transportation lines, or (c) a combination thereof. The method further comprises causing, at least in part, a presentation of at least a portion of the location-based content based, at least in part, on the current proximity, the predicted proximity, or a combination thereof.

According to another embodiment, an apparatus comprises at least one processor, and at least one memory including computer program code for one or more computer programs, the at least one memory and the computer program code configured to, with the at least one processor, cause, at least in part, the apparatus to cause, at least in part, an indexing of location-based content according to one or more location hubs of one or more transportation lines. The apparatus is also caused to determine a current proximity, a predicted proximity, or a combination thereof of one or more devices to the one or more location hubs, wherein the one or more devices are (a) traveling on the one or more transportation lines, (b) predicted to travel on the one or more transportation lines, or (c) a combination thereof. The apparatus is further caused to cause, at least in part, a presentation of at least a portion of the location-based content based, at least in part, on the current proximity, the predicted proximity, or a combination thereof.

According to another embodiment, a computer-readable storage medium carries one or more sequences of one or more instructions which, when executed by one or more processors, cause, at least in part, an apparatus to cause, at least in part, an indexing of location-based content according to one or more location hubs of one or more transportation lines. The apparatus is also caused to determine a current proximity, a predicted proximity, or a combination thereof of one or more devices to the one or more location hubs, wherein the one or more devices are (a) traveling on the one or more transportation lines, (b) predicted to travel on the one or more transportation lines, or (c) a combination thereof. The apparatus is further caused to cause, at least in part, a presentation of at least a portion of the location-based content based, at least in part, on the current proximity, the predicted proximity, or a combination thereof.

According to another embodiment, an apparatus comprises means for causing, at least in part, an indexing of location-based content according to one or more location hubs of one or more transportation lines. The apparatus also comprises means for determining a current proximity, a predicted proximity, or a combination thereof of one or more devices to the one or more location hubs, wherein the one or more devices are (a) traveling on the one or more transportation lines, (b) predicted to travel on the one or more transportation lines, or (c) a combination thereof. The apparatus further comprises means for causing, at least in part, a presentation of at least a portion of the location-based content based, at least in part, on the current proximity, the predicted proximity, or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any method claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 6 is a diagram of a use case of providing hub-based indexing and services while a user is traveling on a transportation line, according to one embodiment;

DESCRIPTION OF SOME EMBODIMENTS

Examples of a method, apparatus, and computer program for providing hub-based indexing and services are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
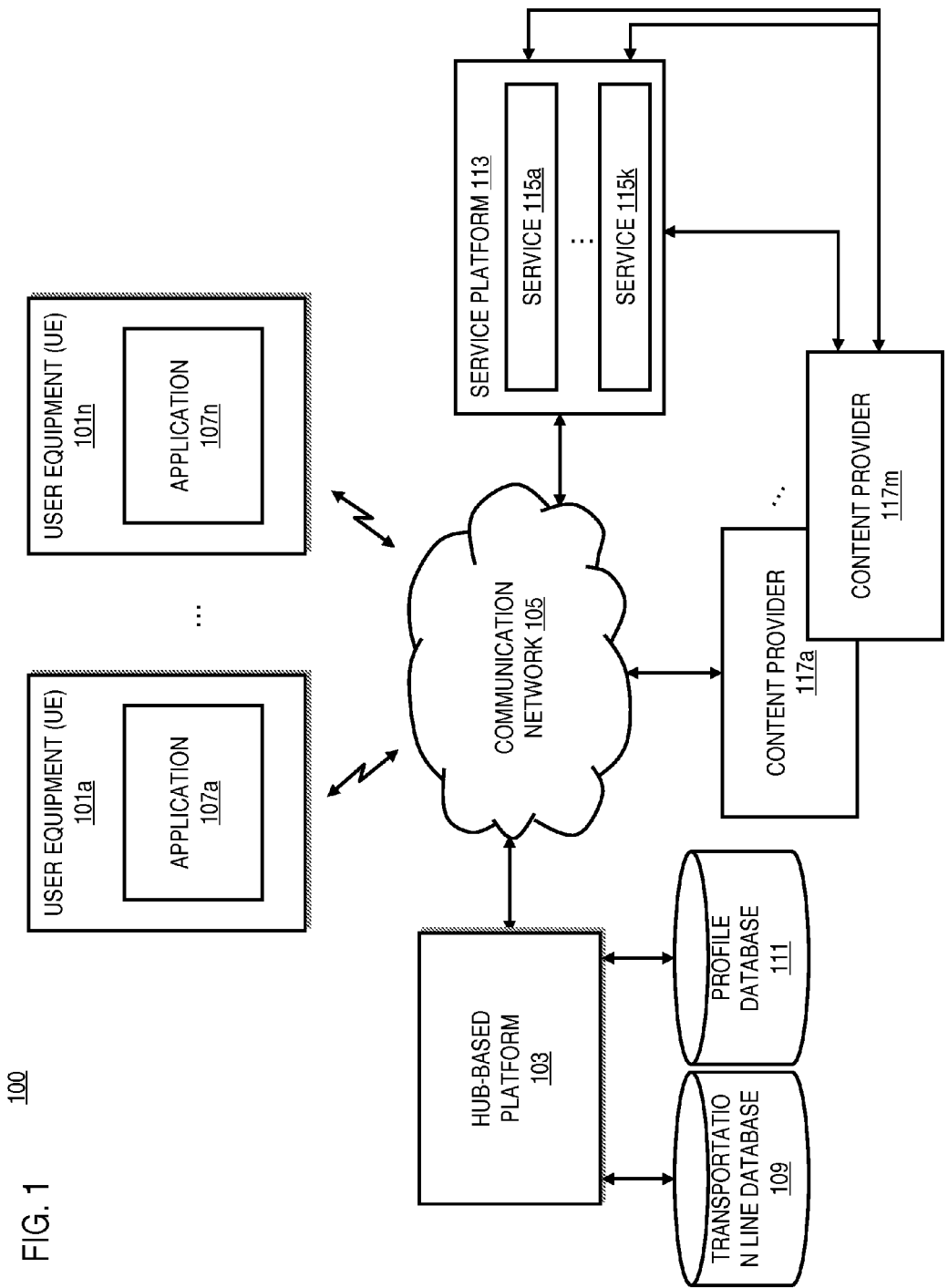
FIG. 1 is a diagram of a system capable of providing hub-based indexing and services, according to one embodiment.

FIG. 1 is a diagram of a system capable of providing hub-based indexing and services, according to one embodiment. As indicated, location-based services may offer users relevant information, such as advertisements, based on their preferences, interests, and location. Moreover, such services may provide relevant content to user based on a prediction of where those users might be in the near future. However, due to randomness associated with user movement, it may be difficult to determine the particular routes that the users will take, the places that the users will pass by, etc.

To address this problem, a system 100 of FIG. 1 introduces the capability to discretize the geo-space, for instance, through location hubs. It is noted that although various embodiments are described with respect to public transportation, it is contemplated that the approach described herein may be used with private transportation along with any combination of private and public transportation systems. Specifically, the system 100 may index location-based content according to location hubs (e.g., bus stops, train stations, subway stations, airports, etc.) of one or more transportation lines; determine a current proximity and/or a predicted proximity of one or more devices, that are traveling (or are predicted to travel) on the transportation lines, to one or more of the location hubs; and present a portion of the location-based content based on the current proximity and/or the predicted proximity. By way of example, the location-based content may relate to places of interest, events, recommendations, advertisements, users associated with the devices, statuses, etc. As noted, in some embodiments, the location hubs and/or the transportation lines may be associated with public transportation. The following scenarios illustrate typical situations which the system 100 can be effective in presenting location-based content, for instance, to users.

In one scenario, a user may be sitting on a bus on his way home from work. On the way, the user may pass by numerous bus stops before getting off at a bus stop near his home. As indicated, location-based content may be organized and/or indexed according to bus stops of one or more transportation lines, including the bus stops that the user passes on his way home. Since the bus only stops at the various bus stops associated with its transportation line, the bus stops may be used to discretize the user's current and future locations. As the user is sitting on the bus, the user's mobile device may present the user with relevant location-based content based on the user's current or predicted proximities to each of the various bus stops. By way of example, the user may be presented with discounts/coupons for shopping items of interest that are located within a predetermined proximity threshold (e.g., distance, time, etc.) from the next bus stop. Because the shopping items are near the next bus stop (e.g., within a close walking distance), the user is easily able to access the shopping items and utilize the discounts/coupons (e.g., the user does not have to go out of his way to use the discounts/coupons). Once the user has finished shopping, the user can simply get back on another bus associated with the same transportation line (e.g., at the same bus stop where he got off) and be on his way home.

In another scenario, a user may be using her mobile phone while relaxing at the office on a weekday afternoon. The system 100 may, for instance, know that the user typically takes a Line X bus to get home from the office on weekday evenings. In fact, the system 100 may know that the user generally gets on a Line X bus at 5:00 PM at the bus stop closest to the office when the user heads home from the office. As such, the system 100 may utilize the user's determined behaviors and goals to offer customized content to the user. A mobile application on the user's mobile phone may, for instance, present the user with content associated with the various bus stops along a predetermined route that the Line X bus takes from the office to the user's home, such as discounts and other deals near the bus stops, based on a prediction that the user will get on the Line X bus at 5:00 PM at the bus stop closest to her office to go home (e.g., deals that are available on weekdays from 5:00 PM to 6:00 PM near the bus stops along the route home). If, for instance, the user finds a deal that she likes, she can simply click on the deal, which may initiate a deal reminder on the mobile application, for instance, to alert the user when she is near the bus stop with the deal (e.g., based on time, distance, etc.). As such, when the user is on her way home, the mobile phone may remind the user of the deal when the bus is approaching the bus stop with the deal. In response to the reminder, the user may get off the bus stop with the deal, buy the item associated with the deal, and then head home by taking the next Line X bus from the bus stop with the deal.

As shown in FIG. 1, the system 100 comprises a user equipment (UE) 101 (or multiple UEs 101a-101n) having connectivity to a hub-based platform 103 via a communication network 105. The UE 101 may include or have access to an application 107 (e.g., applications 107a-107n) to enable the UE 101 to interact with, for instance, the hub-based platform 103, which may: (1) cause an indexing of location-based content according to location hubs of one or more transportation lines; (2) determine a current proximity and/or a predicted proximity of one or more devices, that are traveling (or predicted to travel) on the transportation lines, to one or more of the location hubs; (3) cause presentation of a portion of the location-based content based on the current proximity and/or the predicted proximity; (4) process sensor information associated with the devices to determine the current proximity and/or predicted proximity; (5) determine scheduling information associated with the transportation lines; (6) determine history information relating to prior traveling associated with the devices and the transportation lines; (7) cause transmission of the current proximity and/or the predicted proximity to the devices, merchants, promoters, service providers, etc.; or (8) perform other functions.

In various embodiments, the hub-based platform 103 may include or have access to a transportation line database 109 to access or store indexes of the location-based content, scheduling information associated with transportation lines, feedback information associated with the transportation lines, etc. The hub-based platform 103 may also include or have access to a profile database 111 to access or store account information, user preferences, user selections relating to location-based content (e.g., products, events, promotions, etc., selected by users), history information relating to prior traveling of users on the transportation lines, etc. Data stored in the transportation line database 109 and the profile database 111 may, for instance, be provided by the UEs 101, a service platform 113, one or more services 115 (or services 115a-115k), one or more content providers 117 (or content providers 117a-117m), and/or other services available over the communication network 105. For example, a certain service 115 may provide the scheduling information for transport vehicles of the transportation lines, the UEs 101 may provide feedback associated with the transportation lines, etc. It is noted that the hub-based platform 103 may be a separate entity of the system 100, a part of the one or more services 115 of the service platform 113, or included within the UE 101 (e.g., as part of the application 107).

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In another embodiment, the hub-based platform 103 may process and/or facilitate a processing of sensor information associated with the one or more devices to determine the current proximity, the predicted proximity, or a combination thereof. In one use case, a user may be sitting on a bus on his way home. The user's mobile device may, for instance, include sensors, such as an accelerometer, a compass, a microphone, a camera, etc., that enable the mobile device to detect the speed, the acceleration, the trajectory, surrounding audio, etc. Such information along with other data (e.g., Global Positioning System (GPS) data, Cell Identification (ID), WiFi data, etc.) may then be used to determine which bus the user is currently riding. In addition, the information may be utilized to determine the bus stops that the user has passed and the bus stops that the user will be approaching along with the distances from the various bus stops and the estimated amount of time necessary for the bus to get to the various bus stops.

In another embodiment, the hub-based platform 103 may determine scheduling information associated with the one or more transportation lines, wherein the determination of the current proximity, the predicted proximity, or a combination thereof is based, at least in part, on the scheduling information. By way of example, the scheduling information may include location information associated with various location hubs, the times scheduled for transport vehicles of various transportation lines to arrive at (or depart) the various location hubs, the estimated travel times between the various location hubs, etc. In one use case, a user with a mobile device may be at a subway station ready to get on the next subway train. As such, the arrival/departure time of the next subway train, the estimated travel time, the distance from the subway station to the next subway station, etc., may be used to determine the user's current proximity (e.g., time, location, etc.) to the next subway station.

In another embodiment, the hub-based platform 103 may determine history information relating to prior traveling associated with the one or more devices and the one or more transportation lines, wherein the determination of the current proximity, the predicted proximity, or a combination thereof is based, at least in part, on the history information. By way of example, the history information associated with a particular user may include data relating to (1) how frequently the user utilized a particular transportation line, (2) how frequently the user utilized the various location hubs of the transportation line for departure, (3) the time and day that the user utilized the transportation line or the various location hubs, (4) the activities that the user conducted while traveling on the transportation line or after departing at the various location hubs (e.g., purchases that the user made, events that the user attended, presented recommendations/promotions that the user took advantage of, etc.), and (5) the like. Moreover, such history information may, for instance, be utilized to determine travel behaviors, patterns, goals, etc., of the user.

In one scenario, a user's history information relating to prior traveling on a particular transportation line may be used to determine the user's travel behaviors and patterns (e.g., on certain days and times of the week). The hub-based platform 103 may, for instance, determine that a user typically takes the subway train X at subway station A at 7:00 AM on weekday mornings to travel to subway station N for work. As a result, the hub-based platform 103 may instruct the user's mobile device to present some breakfast deals to the user that are near various subway stations from A to N. In a further scenario, the breakfast deals may be presented to the user the night before to enable the user to select the breakfast deals that he may be interested in the next morning. Additionally, the hub-based platform 103 may utilize subway scheduling information to predict the times in which the user will be at each of the various subway stations, for instance, to determine which breakfast deals will be available for the user (e.g., a breakfast deal at subway station N that only lasts until 7:30 AM may not be presented to the user if it is determined that the user will not arrive at subway station N until 8:00 AM according to the scheduling information).

In another embodiment, the hub-based platform 103 may cause, at least in part, a transmission of the current proximity, the predicted proximity, or a combination thereof to the one or more devices, one or more merchants, one or more promoters, one or more service providers, or a combination thereof. By way of example, the hub-based platform 103 may be simultaneously monitoring a plurality of devices associated with a plurality of users to determine their respective proximities (e.g., current proximity, predicted proximity, etc.) to each of the location hubs. The proximity information may, for instance, be analyzed and then selectively transmitted to merchants and promoters. In one use case, merchants and promoters within a predetermined proximity threshold of a particular location hub may receive proximity information associated with the devices (or the users) that are, or will be, within a predetermined proximity threshold of the location hub. The proximity information may, for instance, be used to inform those merchants and promoters how many users will pass by their stores, events, advertisements, etc., along with the determined dates and times that the users will pass by their stores, events, advertisements, etc. Additionally, or alternatively, the hub-based platform 103 may provide the merchants and promoters other user information, such as the types of users that will walk by, the types of deals that they are interested in, etc.

By way of another example, the proximity information may be analyzed and selectively transmitted to the plurality of devices. For instance, users with similar interests, goals, characteristics, etc., who will also be within a predetermined proximity threshold of a particular location hub may have their respective profile information along with their proximity information sent to each other (e.g., via their individual devices). As such, users may be notified of other users with similar interests, goals, characteristics, etc., who are, or will be, around the same location hub at around the same time. Notifications may, for instance, include (1) identification of the other users, (2) the interests, goals, characteristics, etc., of the other users, and (3) the times that the other users will be around the location hub. In addition, these notifications may be in the form of suggestions for these users to get together, activity recommendations for these users, (e.g., lunch/dinner, sporting activity, night club event, cooking lessons, etc.), etc. By way of a further example, the proximity information may be analyzed and selectively transmitted to one or more service providers. In one use case, the proximity information associated with a particular user may be transmitted to a hotel that the user has reserved a room with. The hotel may thus make preparations for the user based on the user's arrival time derived from the proximity information. Additionally, or alternatively, once the hotel determines that the user is within a predetermined proximity threshold of a particular location hub, the hotel may send a notification to the user's device to enable the user to check-in to the hotel. In this way, the user can avoid standing in line, and the keys may be provided to the user as soon as the user arrives at the hotel.

In another embodiment, the hub-based platform 103 may determine contextual information associated with the one or more devices, the one or more location hubs, the one or more transportation lines, or a combination thereof, wherein the determination of the current proximity, the predicted proximity, or a combination thereof is based, at least in part, on the contextual information. In one scenario, traffic information associated with a transportation line and its associated location hubs (e.g., a train line and its associated train stations, a bus line and its associated bus stops, etc.) may, for instance, be used along with other information (e.g., scheduling information, history information, etc.) to determine how long it will take a user traveling on the transportation line to arrive at the various location hubs of the transportation line. In a further scenario, a user may be traveling with a friend on a particular bus line in the evening to go home from an event. On the way home, the bus that the user and the friend are traveling on may, for instance, encounter heavy traffic. The hub-based platform 103 may determine from the user's history information that the user has decided in the past to have unscheduled dinner with friends when she encounters heavy traffic while traveling on the bus. Thus, based on this history information, the heavy traffic, and the fact that the user is with her friend, the hub-based platform 103 may take into account that the user may stop for dinner when predicting the proximity of the user to various bus stops (e.g., the amount of time it will take to reach various bus stops).

In another embodiment, the hub-based platform 103 may determine one or more selections relating to the portion of the location-based content by one or more users associated with the one or more devices. In a further embodiment, the hub-based platform 103 may cause, at least in part, a notification relating to the portion of the location-based content based, at least in part, on the one or more selections, wherein the presentation of the portion of the location-based content includes, at least in part, the notification. By way of example, a user may be traveling home on a bus from his office. While the user is on the bus, he may take a moment to browse shopping deals that are presented on his mobile device based on the bus stops that the bus will stop at on his way home. The user may, for instance, find interesting shoes at a 50% discount and, thus, the user may flag the deal. As a result, the mobile device may set an alarm to remind the user to get off at the bus stop associated with the particular deal when the user is within a predetermined proximity threshold of that bus stop (e.g., the mobile device will present the deal with the reminder when the user is 2 minutes away, one bus stop away, etc.).

In another embodiment, the hub-based platform 103 may determine feedback information associated with the one or more location hubs, the one or more transportation lines, or a combination thereof from the one or more devices. In a further embodiment, the hub-based platform 103 may process and/or facilitate a processing of the feedback information to cause, at least in part, a classification relating to the one or more location hubs, the one or more transportation lines, or a combination thereof based, at least in part, on the current proximity, the predicted proximity, or a combination thereof. In one scenario, the hub-based platform 103 may receive, from the users' devices, information relating to the location hubs that the users get off at, the types of users that get off at each of the location hubs (e.g., age range, interests, personalities, associated social groups, etc.), the location-based content that the users have indicated interest in at each of the location hubs, the activities that the users have engaged in near each of the location hubs, etc. The hub-based platform 103 may then, for instance, use this feedback information to associate classifications to each of the location hubs (e.g., Hub 1 may be associated with users of ages 20-30, Hub 2 may be associated with users of 30-40, Hub 3 may be associated with the hip-hop crowd, Hub 4 may be associated with great shoe deals, etc.).

For illustrative purposes, the following models and equations are provided below. By way of example, in an offline model (e.g., user is currently not traveling on the bus), the probabilities associated with the user's travel behaviors and patterns may, for instance, be determined based on the equation: $P(BUS_j|context=day, time, other context)$. A bus may be modeled as the stop sequence from the first b to the last stops e that the user has taken: $BUS_j=(s_{l,b}, s_{l,b}, \ldots, S_{l,e}), s_{l,b}, s_{l,e} \in SP$ (home, office, school, . . . ), where the first and the last stops can be generally defined as significant places (SP) that matter to the user. For simplicity, the user's travel goal may be defined as: $Goal=(s_{l,b} \to s_{l,e})=(sp_i \to sp_j)$(e.g., (office→home), (shop→home): go home; (home→shop): go shopping). Thus, a user's needs may be inferred based on the goal. Prediction modeling may also be utilized, for instance, to identify the targeted user who will likely take the bus, and to generate bus stop related contents for the targeted user given the most likely context (e.g., bus=$arg_j$max $P(BUS_j|context=day, time, other context)$).

With a large amount of user data, the following business information can be derived: (1) real time bus arrival information $P(loc_t|BUS)$ over all bus lines and users: given $j^{th}$ bus line $BUS_j$, the proximity of the next bus ($loc_t$) may be determined and its arrival time may be predicted for the given stop by estimated speed and distance at time t; (2) real time traffic information $P(v_t|loc_t, BUS_j)$: given street modeled by position or graph, the average speed over users at location $loc_t$ may be determined to form the street map with average moving speed at time t, indicating whether there is traffic information (e.g., normal, traffic jam, etc.) for a travel planner; (3) behavior targeted user information (e.g., prediction) $P(BUS_j|context=day, time, other context)$: given bus line or stop, merchants/advertisers can predict potential users who regularly travel through the stop with the best context/schedule estimation in terms of time of day, enabling those merchants/advertisers to target those potential users based on user preference matching; (4) context-aware targeted user information (e.g., real time benefit) $P(loc_t|BUS)$: for those who are approaching the given bus stop, stop location related content will be shared based on user preference matching; (5) business targeted information $P(loc_t|BUS_j)$: spatial-temporal statistics on tuple (user_number, stop_location, time) may be used to derive: (a) user number distribution over time indicating when are the peak hours to run the best business; (b) user number distribution over all stops indicating where are the hot spots/stops that may have more users in a particular day; and (3) flexible/targeted business strategy, discount policy, etc., by merchants/advertisers to maximize their profits. By summing up all the users per day along the time, one can monitor the gross number of users taking the bus, indicating green transportation scale, or as smart commuting measure counting those who travels between the home and the office based on significant place pattern recognition.

By way of another example, in a real-time model (e.g., user is currently traveling on the bus), the determination of a user's travels may be based on: bus=$arg_j$max $P(BUS_j|loc_{1:t}, v_{1:t}, context) \approx arg_j$max $P(loc_{1:t}|BUS_j) \cdot P(v_{1:t}|loc_{1:t}, BUS_j) \cdot P(BUS_j|context=day, time, other context)$, where bus is modeled as the stop sequence, and $loc_{1:t}$ and $v_{1:t}$ are the user's location and the velocity during time period of (1:t). It is noted that the user's travel goal can be estimated accordingly.

By way of a further example, the travel behavior may be used to perform collaborative prediction. In one scenario, assume N users who have frequently traveled by bus having M bus stops in total. The following associated matrix is provided below:

$$US_{User \times Stop} = \begin{bmatrix} S_{11} & \ldots & S_{1M} \\ \ldots & \ldots & \ldots \\ S_{N1} & \ldots & S_{NM} \end{bmatrix}$$

Referring the matrix, $S_{ij}$=(context:sp:rating:frequency) indicating that $i^{th}$ user normally passes $j^{th}$ bus stop with certain visiting frequency under the context. The bus stop can be either significant places or interim. Similarities of the user's bus travel pattern with other users' bus travel patterns can be calculated for potential social activity discovery. Furthermore, recommendation, such as place recommendations, may be offered. Rating can be estimated based on user-stop interaction, such as number of clicks, bus stop reminder (e.g., primarily for interim stops), etc. In one use case, content for a particular bus stop may be recommended for a user based on other similar users' feedback. Each bus stop may, for instance, be characterized from crowdsourcing, such that information may be received from users at each of the bus stops to classify and categorize the various meaning of the bus stops.

By way of example, the UE 101, the hub-based platform 103, the service platform 113, the services 115, and the content providers 117 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
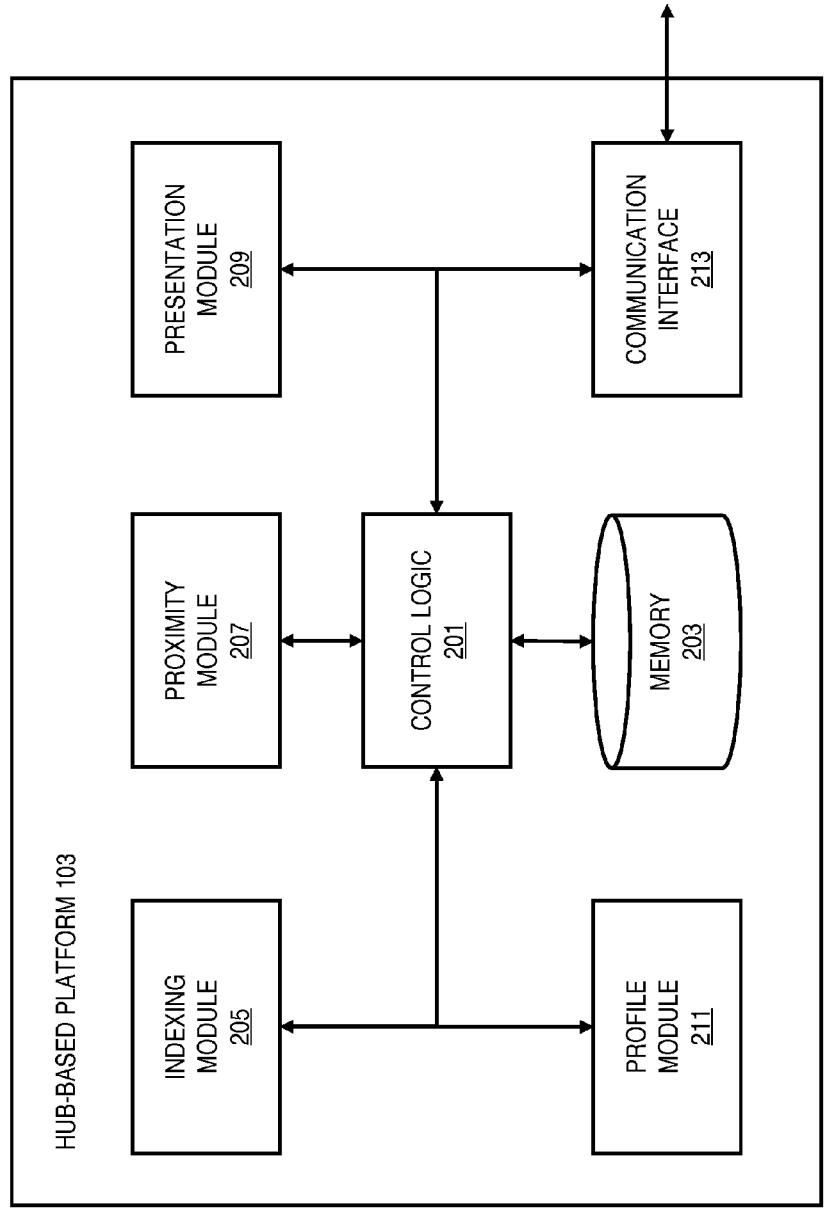
FIG. 2 is a diagram of the components of a hub-based platform, according to one embodiment.

FIG. 2 is a diagram of the components of a hub-based platform, according to one embodiment. By way of example, the hub-based platform 103 includes one or more components for providing hub-based indexing and services. It is contemplated that the functions of these components may be combined in one or more components or performed by other components of equivalent functionality. In this embodiment, the hub-based platform 103 includes control logic 201, memory 203, an indexing module 205, a proximity module 207, a presentation module 209, a profile module 211, and a communication interface 213.

The control logic 201 executes at least one algorithm for executing functions of the hub-based platform 103. For example, the control logic 201 may interact with the indexing module 205 to initiate indexing of location-based content according to the location hubs of one or more transportation lines. As indicated, location-based content may relate to places of interest, events, recommendations, advertisements, users associated with the devices, statuses, etc. Content related to particular places of interest may, for instance, be indexed for a location hub that the places of interest are located near, an advertisement featuring a discounted item may be indexed for a location hub that the discounted item is located near, etc.

The control logic 201 may also work with the proximity module 207 to determine a current proximity and/or a predicted proximity of one or more devices to various location hubs of the transportation lines, wherein the devices are traveling on the transportation lines and/or predicted to travel on the transportation lines. The proximity module 207 may, for instance, determine the current proximity and/or the predicted proximity by processing: (1) sensor information associated with the one or more devices (e.g., speed, acceleration, trajectory surrounding audio, images, etc.); (2) scheduling information associated with the transportation lines; (3) history information associated with the devices and the transportation lines; (4) contextual information associated with the devices, the location hubs, and/or the transportation lines; (5) and the like. It is noted that because the location hubs are provided for indexing the location-based content and to determine the proximity information of the devices (associated with one or more users who are also traveling, or predicted to travel, on the transportation lines), the geo-space in which the users and devices are located may be discretized to ease system processing requirements while still meeting user needs (e.g., a bus can only stop at designated bus stops, a train can only stop at designated train stations, etc.).

The control logic 201 may then direct the presentation module 209 to cause a presentation of a portion of the location-based content based on the current proximity and/or the predicted proximity. The presentation of the portion of the location-based content may, for instance, be rendered on a user's device based on the proximity of the device to the various location hubs of the transportation line on which the user is traveling and/or predicted to travel on. In one scenario, a user may be on her way home from the office on a weekday evening, which may be determined based on her history information (e.g., the user typically utilizes a train to go home from the office on weekday evenings). The profile module 211 may, for instance, determine from history information stored in the profile database 111 that the user typically starts her route home by initially taking a Line X train at train station X1, and then switching to a Line Y train at train station X4/Y3 to get to train station Y7 where her home is located near. The determination by the profile module 211 may thus be communicated to the proximity module 207. As a result, when the user is riding the Line X train, the proximity module 207 may determine that the user is currently on the Line X train, but also predict that the user will soon be on the Line Y train. Thus, the portion of the location-based content presented to the user may include the indexed content for train stations X1-X4 and train stations Y3-Y7 based on the current and/or predicted proximities of the user's device to the various train stations. Moreover, the profile module 211 may determine preferences, interests, goals, characteristics, etc., of the user. As such, the presentation of the portion of the location-based content may also be based on the preferences, interests, goals, characteristics, etc., of the user.

The control logic 201 may additionally utilize the communication interface 213 to communicate with other components of the hub-based platform 103, the UEs 101, the service platform 113, the services 115, the content providers 117, and other components of the system 100. For example, the communication interface 213 may be utilized to receive sensor information, scheduling information, etc., and provide such data to the proximity module 207 to determine the current and/or predicted proximities of the user devices to the various location hubs. The communication interface 213 may further include multiple means of communication. In one use case, the communication interface 213 may be able to communicate over short message service (SMS), multimedia messaging service (MMS), internet protocol, email, instant messaging, voice sessions (e.g., via a phone network), or other types of communication.

Figure 3:
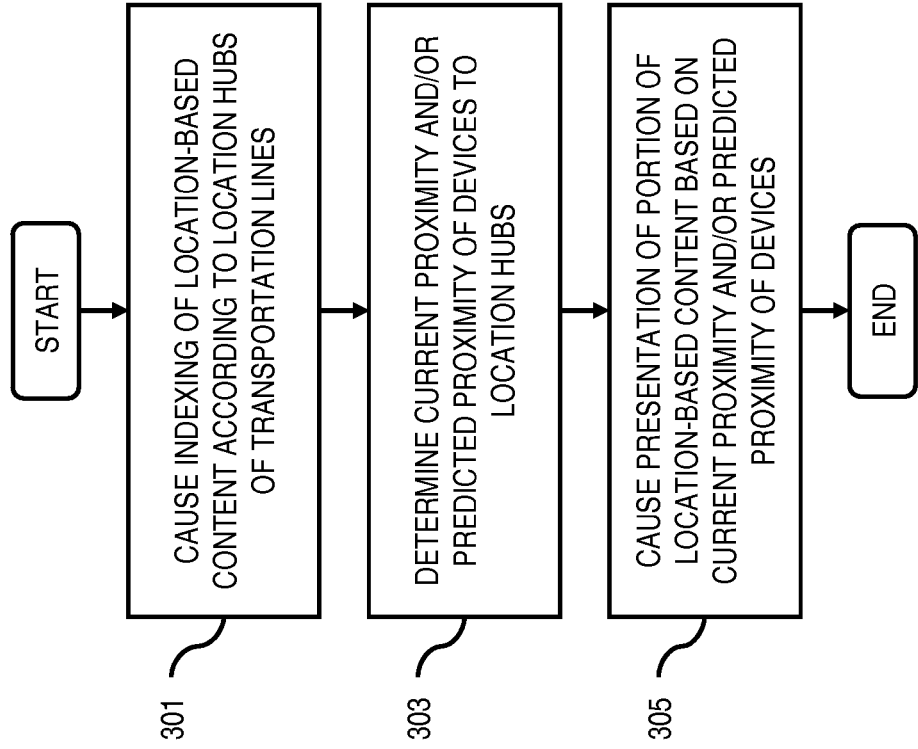
FIG. 3 is a flowchart of a process for providing hub-based indexing and services, according to one embodiment.
Figure 9:
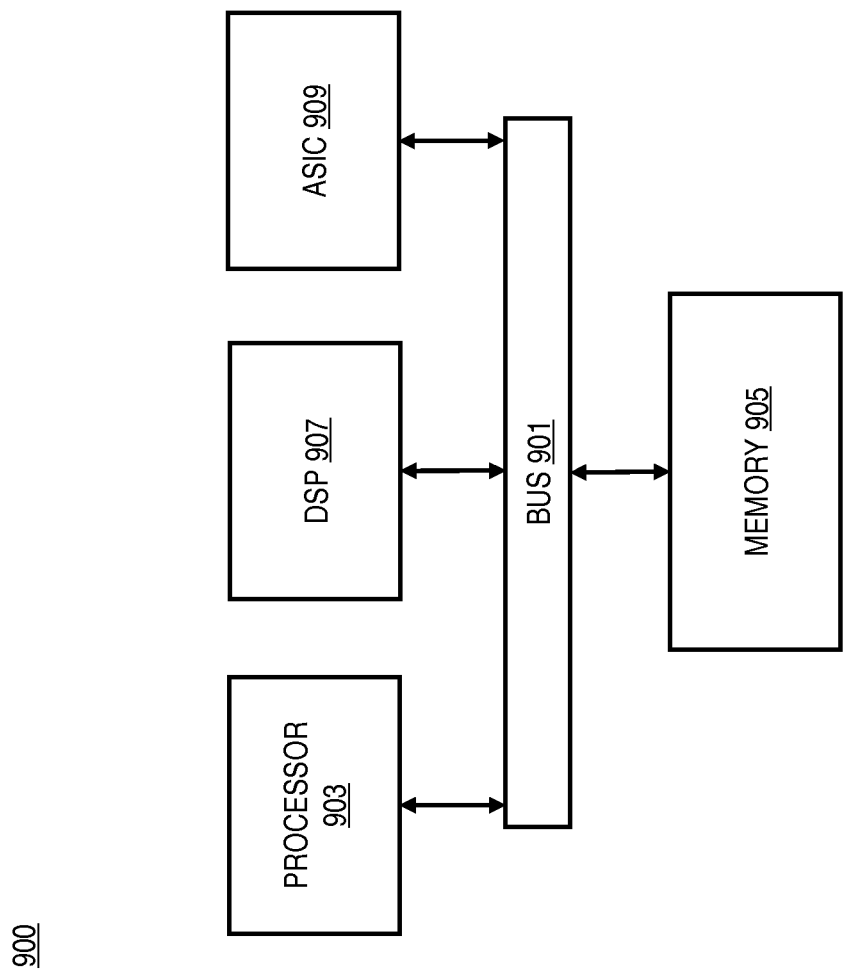
FIG. 9 is a diagram of a chip set that can be used to implement an embodiment of the invention.

FIG. 3 is a flowchart of a process for providing hub-based indexing and services, according to one embodiment. In one embodiment, the hub-based platform 103 performs the process 300 and is implemented in, for instance, a chip set including a processor and a memory as shown in FIG. 9. As such, the control logic 201 can provide means for accomplishing various parts of the process 300 as well as means for accomplishing other processes in conjunction with other components of the hub-based platform 103.

In step 301, the control logic 201 may cause, at least in part, an indexing of location-based content according to one or more location hubs of one or transportation lines. By way of example, the location-based content may relate, at least in part, to one or more places of interest, one or more events, one or more recommendations, one or more advertisements, one or more users associated with the one or more devices, one or more statuses, or a combination thereof. It is noted that, in some embodiments, the one or more location hubs, the one or more transportation lines, or a combination thereof may be associated with public transportation. As mentioned, however, it is contemplated that the approach described herein may be used with private transportation along with any combination of private and public transportation systems.

In step 303, the control logic 201 may determine a current proximity, a predicted proximity, or a combination thereof of one or more devices to the one or more location hubs, wherein the one or more devices are (a) traveling on the one or more transportation lines, (b) predicted to travel on the one or more transportation lines, or (c) a combination thereof. As such, the control logic 201 may then, at step 305, cause, at least in part, a presentation of at least a portion of the location-based content based, at least in part, on the current proximity, the predicted proximity, or a combination thereof of the devices.

Figure 4:
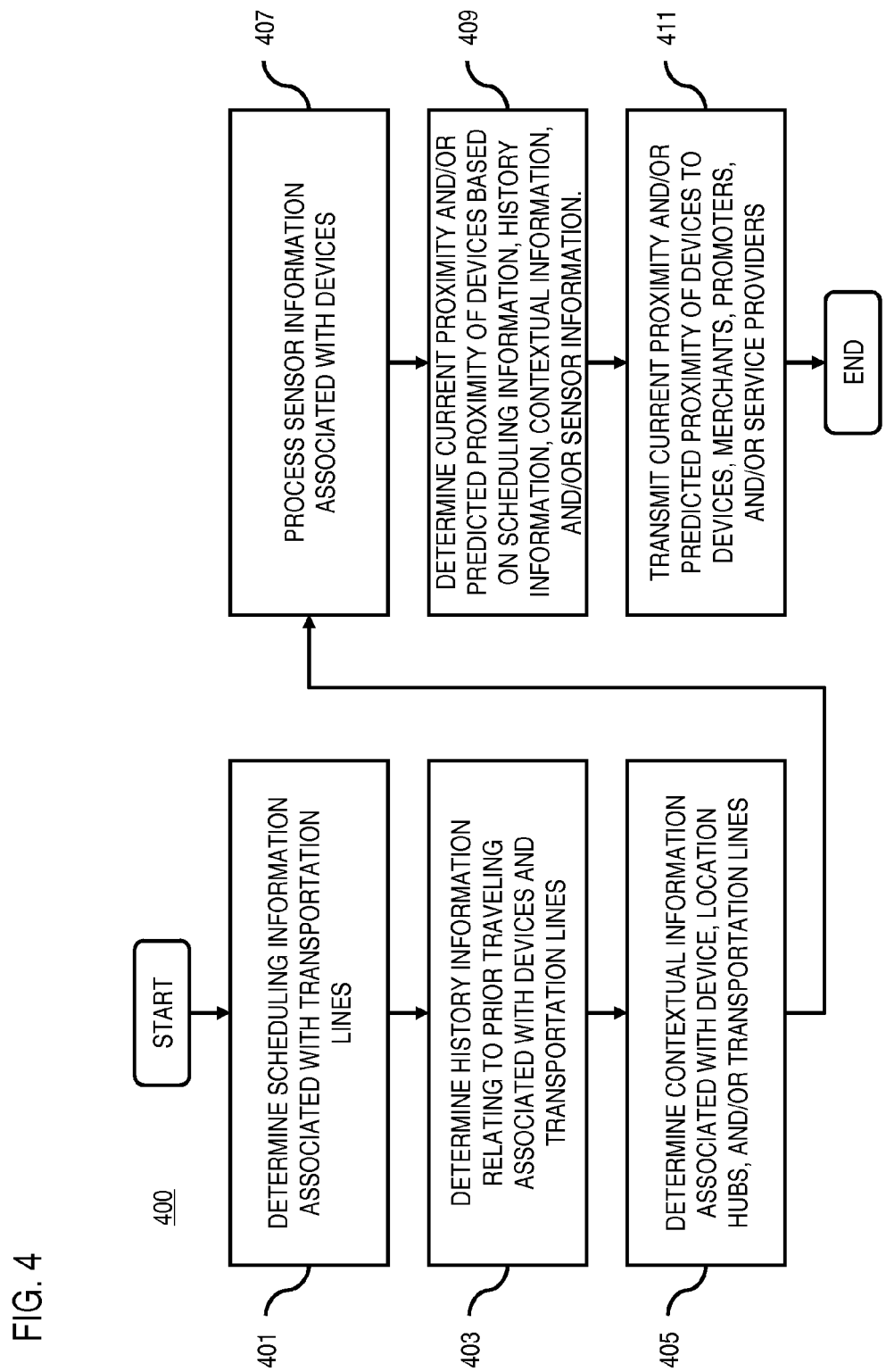
FIG. 4 is a flowchart of a process for determining and transmitting hub-based proximity information, according to one embodiment.

FIG. 4 is a flowchart of a process for determining and transmitting hub-based proximity information, according to one embodiment. In one embodiment, the hub-based platform 103 performs the process 400 and is implemented in, for instance, a chip set including a processor and a memory as shown in FIG. 9. As such, the control logic 201 can provide means for accomplishing various parts of the process 400 as well as means for accomplishing other processes in conjunction with other components of the hub-based platform 103.

In step 401, the control logic 201 may determine scheduling information associated with the one or more transportation lines. The scheduling information may, for instance, be accessed through or obtained from the transportation line database 109. As discussed, the scheduling information may include location information associated with various location hubs, the times scheduled for transport vehicles of various transportation lines to arrive at (or depart) the various location hubs, the estimated travel times between the various location hubs, etc.

In step 403, the control logic 201 may determine history information relating to prior traveling associated with the one or more devices and the one or more transportation lines. By way of example, the history information associated with a particular user may include data relating to (1) how frequently the user utilized a particular transportation line, (2) how frequently the user utilized the various location hubs of the transportation line for departure, (3) the time and day that the user utilized the transportation line or the various location hubs, (4) the activities that the user conducted while traveling on the transportation line or after departing at the various location hubs (e.g., purchases that the user made, events that the user attended, presented recommendations/promotions that the user took advantage of, etc.), and (5) the like. Moreover, such history information may, for instance, be utilized to determine travel behaviors, patterns, goals, etc., of the user.

In step 405, the control logic 201 may determine contextual information associated with the one or more devices, the one or more location hubs, the one or more transportation lines, or a combination thereof. Examples of such contextual information may, for instance, relate to traffic associated with the location hubs and/or the transportation lines that a particular user is traveling on or is predicted to travel on, other users traveling or predicted to travel with the user, weather information, regions/areas associated with the location hubs and the transportation lines, and the like.

In step 407, the control logic 201 may process and/or facilitate a processing of sensor information associated with the one or more devices. As indicated, the one or more devices may include one or more sensors, such as an accelerometer, a compass, a microphone, a camera, etc., that enable the mobile device to detect the speed, the acceleration, the trajectory, surrounding audio, images, etc. The sensor information may, for instance, be utilized along with other data (e.g., GPS data, Cell ID, WiFi data, etc.) to determine the transportation line that a user is or will be traveling on, the location hubs that the user has passed or will be approaching, the distances and the estimated time to get to various other location hubs, etc.

As such, in step 409, the control logic 201 may determine the current proximity, the predicted proximity, or a combination thereof of the one or more devices to the one or more location hubs based the scheduling information, the history information, the contextual information, the sensor information, or a combination thereof. By way of example, the history information may be used to determine a user's travel behavior, patterns, and goals (e.g., the user typically goes home from the office on weekday evenings using transportation line X from location hub A to location hub B). The travel behavior, patterns, and goals may then be analyzed with the scheduling information, the contextual information, and the sensor information, for instance, to determine how long it will take the user to arrive at each of the location hubs along the transportation lines that the user is or will be traveling on. In one use case, the proximity information may be determined by analyzing the route according to the transportation lines that the user is predicted to take (e.g., the user may switch transportation lines to go home from the office) along with the estimated time of arrival at each of the location hubs on a typical day, the current traffic, and the speed, acceleration, trajectory, etc., of the transport vehicles of the transportation lines.

Additionally, in step 411, the control logic 201 may cause, at least in part, a transmission of the current proximity, the predicted proximity, or a combination thereof to the one or more devices, one or more merchants, one or more promoters, one or more service providers, or a combination thereof. As provided, in one use case, the proximity information may be analyzed and then selectively transmitted to merchants and promoters. For example, merchants and promoters within a predetermined proximity threshold of a particular location hub may receive proximity information associated with the devices (or the users) that are, or will be, within a predetermined proximity threshold of the location hub. The proximity information may, for instance, be used to inform those merchants and promoters how many users will pass by their stores, events, advertisements, etc., along with the determined dates and times that the users will pass by their stores, events, advertisements, etc.

Figure 5A:
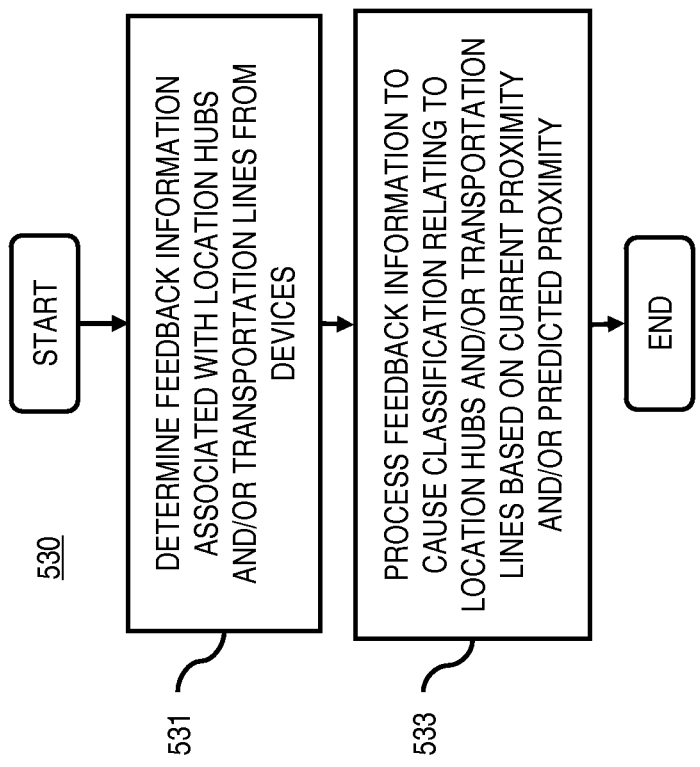
FIG. 5A is a flowchart of a process for presenting notifications of selected items, according to one embodiment.

FIG. 5A is a flowchart of a process for presenting notifications of selected items, according to one embodiment. In one embodiment, the hub-based platform 103 performs the process 500 and is implemented in, for instance, a chip set including a processor and a memory as shown in FIG. 9. As such, the control logic 201 can provide means for accomplishing various parts of the process 500 as well as means for accomplishing other processes in conjunction with other components of the hub-based platform 103.

In step 501, the control logic 201 may determine one or more selections relating to the portion of the location-based content by one or more users associated with the one or more devices. The control logic 201 may then, at step 503, cause, at least in part, a notification relating to the portion of the location-based content based, at least in part, on the one or more selections, wherein the presentation of the portion of the location-based content includes, at least in part, the notification. By way of example, if a user flags a particular deal relating to the portion of the location-based content, an alarm may be set to remind the user to get off at the bus stop associated with the deal when the user is within a predetermined proximity threshold of that bus stop (e.g., the user's mobile device may present the deal with the reminder when the user is 2 minutes away, one bus stop away, etc.).

Figure 5B:
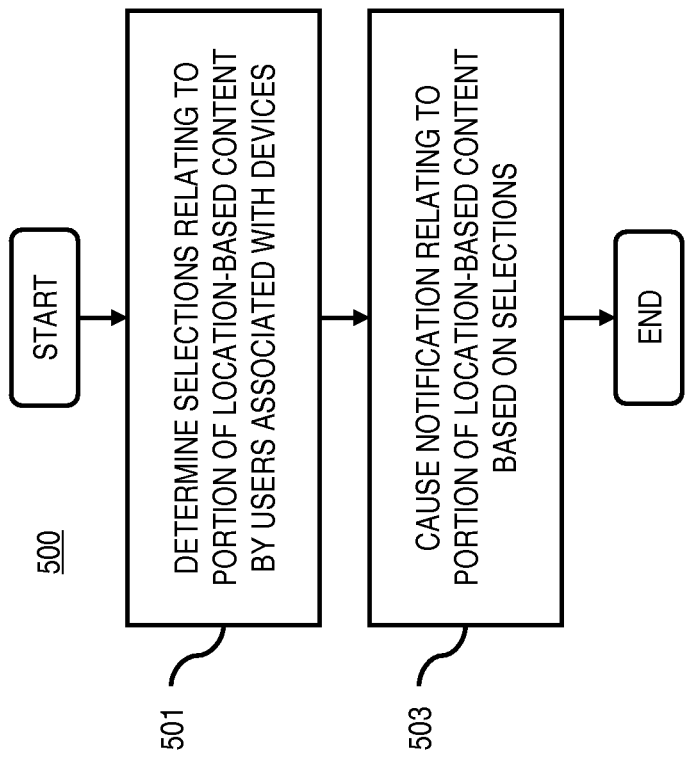
FIG. 5B is a flowchart of a process for providing classifications relating to a location hub and/or a transportation line, according to one embodiment.

FIG. 5B is a flowchart of a process for providing classifications relating to a location hub and/or a transportation line, according to one embodiment. In one embodiment, the hub-based platform 103 performs the process 530 and is implemented in, for instance, a chip set including a processor and a memory as shown in FIG. 9. As such, the control logic 201 can provide means for accomplishing various parts of the process 530 as well as means for accomplishing other processes in conjunction with other components of the hub-based platform 103.

In step 531, the control logic 201 may determine feedback information associated with the one or more location hubs, the one or more transportation lines, or a combination thereof from the one or more devices. As mentioned, examples of feedback information that may be receive from the users' devices may include data with respect to the location hubs that the users get off at, the types of users that get off at each of the location hubs (e.g., age range, interests, personalities, associated social groups, etc.), the location-based content that the users have indicated interest in at each of the location hubs, the activities that the users have engaged in near each of the location hubs, etc. As such, in step 533, the control logic 201 may process and/or facilitate a processing of the feedback information to cause, at least in part, a classification relating to the one or more location hubs, the one or more transportation lines, or a combination thereof based, at least in part, on the current proximity, the predicted proximity, or a combination thereof (e.g., Hub 1 may be associated with users of ages 20-30, Hub 2 may be associated with users of 30-40, Hub 3 may be associated with the hip-hop crowd, Hub 4 may be associated with great shoe deals, etc.).

FIG. 6 is a diagram of a use case of providing hub-based indexing and services while a user is traveling on a transportation line, according to one embodiment. As shown, a user 601 is be traveling on bus 603 of a particular transportation line associated with a predetermined route 605. While the user 601 is traveling on the bus 603, user interface 607 of the UE 101 presents the user 601 with location-based content based on the current and/or predicted proximities of the UE 101 to various bus stops along the predetermined route 605 that the bus 603 is scheduled to stop at to pick up and drop off passengers. As illustrated, the user 601 is notified that he will arrive at the next stop (e.g., Stop B) in about 1 minute, and that "Shop #1 has a 40% discount on jewelry that your wife may be interested in."

Moreover, the user 601 is notified that he will arrive at Stop C in about 5 minutes and two stops, and that "The item you selected to buy is at Stop C!" As such, the user 601 may have been previously presented with location-based content, for instance, according to a prediction that the user 601 would be within a predetermined proximity threshold of the particular bus stop with the item. The user 601 may then have selected the item (which was included as part of the presented location-based content) as an item he'd like to buy. Thus, the hub-based platform 103 may have set up a notification to remind the user 601 of the item when the user 601 is within a certain proximity from a bus stop associated with the item. If, for instance, the selection of the item is based on a particular deal on the item, the notification may be presented to the user 601 when he is within certain proximity from bus stops with the particular deal.

Furthermore, the user 601 is notified that he will arrive at Stop D in about 10 minutes and three stops, and that "Your friend, Steve, will pass by Stop D in about 20 minutes. Press '1' to dial Steve." Steve may, for instance, be another user traveling on (or predicted to travel on) on different bus on the same (or different) transportation line as user 601. In one scenario, the user 601 and Steve are "friends" in a social network group, and Steve has set his preferences to allow transmission of his proximity information to "friends" in his social network group. As such, when Steve's current and/or predicted proximities to Stop D are determined, data that includes the proximities may be sent to the hub-based platform 103 for transmission to the UE 101 of the user 601. Thus, user 601 may press "1" to dial Steve if, for instance, the user 601 would like to get together with Steve. In this way, the hub-based platform 103 may effectively assist users in accessing items, events, places of interest, etc., along with other users without necessarily requiring these users to travel out of their way. That is, in some embodiments, the presentation of the location-based content (including the notifications, reminders, alerts, etc.) to a particular user may be designed to fit with a typical schedule and/or the current, intended route of that user.

Figure 7:
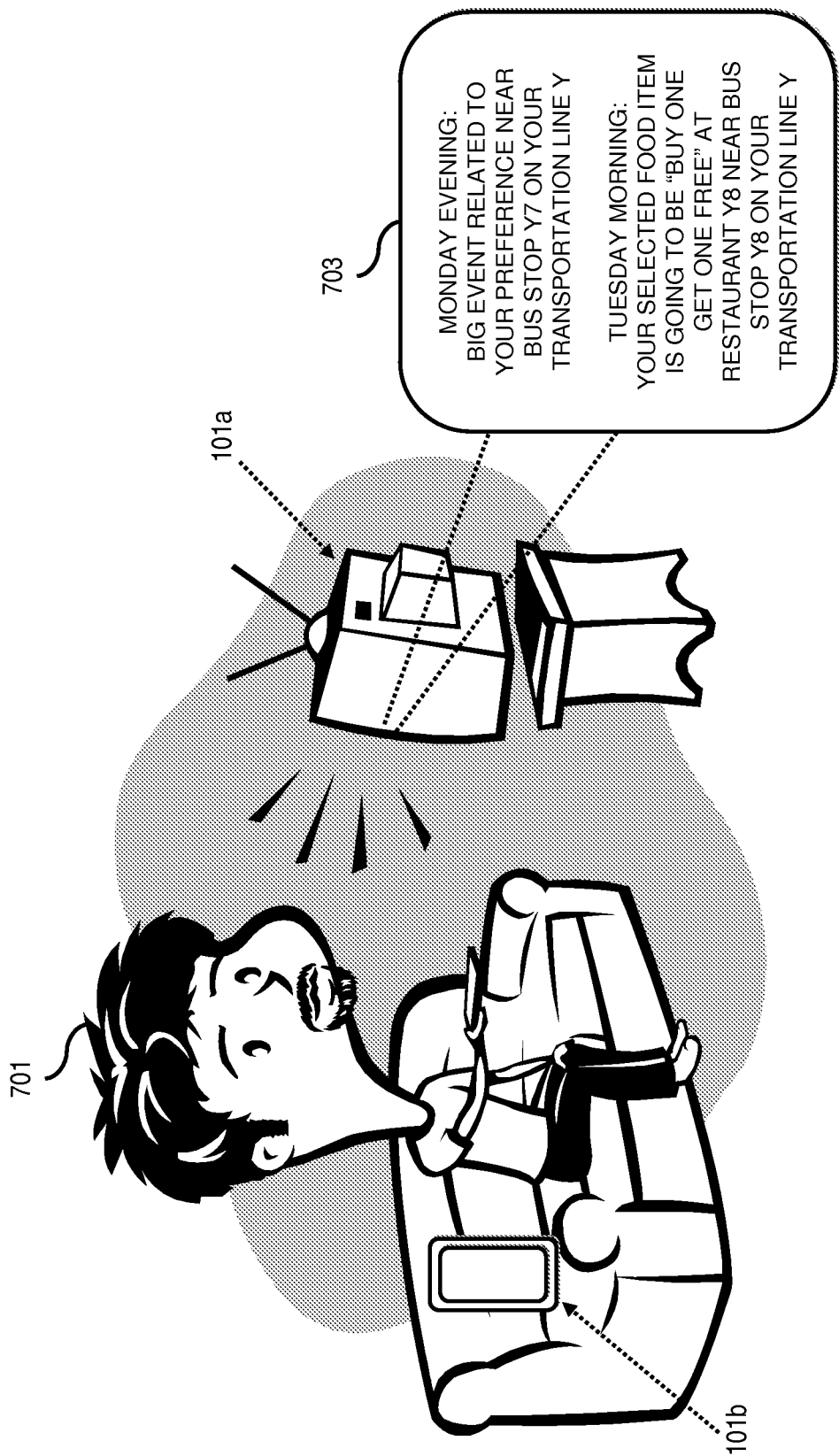
FIG. 7 is a diagram of a use case of providing hub-based indexing and services while a user is not currently traveling on a transportation line, according to one embodiment.

FIG. 7 is a diagram of a use case of providing hub-based indexing and services while a user is not currently traveling on a transportation line, according to one embodiment. As shown, user 701 is relaxing at home watching television (e.g., UE 101*a*) with his mobile phone (e.g., UE 101*b*) at his side. In this scenario, the user 701 typically travels from his house to his office on weekday mornings using his city's public bus transportation system (e.g., Transportation Line 5). Similarly, on weekday evenings, the user 701 generally travels from his office to his house using his city's public bus transportation system. While traveling to and from the office, the user 701 has his mobile phone with him. Based on his travel-related history information, the hub-based platform 103 may, for instance, determine a predicted proximity of the user 701 on certain days and at various times. As indicated, location-based content may be indexed according to the one or more bus stops of one or more transportation lines. In this scenario, location-based content is indexed at least according to the bus stops that the bus associated with Transportation Line 5 (e.g., the transportation line that user 701 takes to and from the office). Thus, one or more portions of the indexed content may be presented to the user 701 based on the predicted proximity of the user 701 on certain days and at various time and based on the preferences, interests, etc., of the user 701. It is noted that the presentation may be rendered on the mobile phone or another other device that the user 701 may be watching or browsing.

As depicted, on user interface 703, the user 701 is notified on the television that there is a "big event related to your preference near Bus Stop Y7 on your Transportation Line Y" on Monday evening. If, for instance, the user 701 is interested in the event, he may flag the event (e.g., using his mobile phone, his remote control, etc.), which will cause an alert to be set up to remind the user of the event on his trip home from work on Monday evening (e.g., when the user is within a certain proximity of Bus Stop Y7). In addition, the user 701 is notified that "your selected food item is going to be "buy one get one free" at Restaurant Y8 near Bus Stop Y8 on your Transportation Line Y" on Tuesday morning. As indicated, the food deal at Restaurant Y8 has already been selected. Consequently, an alert may have already been set up to remind the user 701 of the food deal on his trip to the office from his house on Tuesday morning (e.g., when the user is within a certain proximity of Bus Stop Y8).

The processes described herein for providing hub-based indexing and services may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
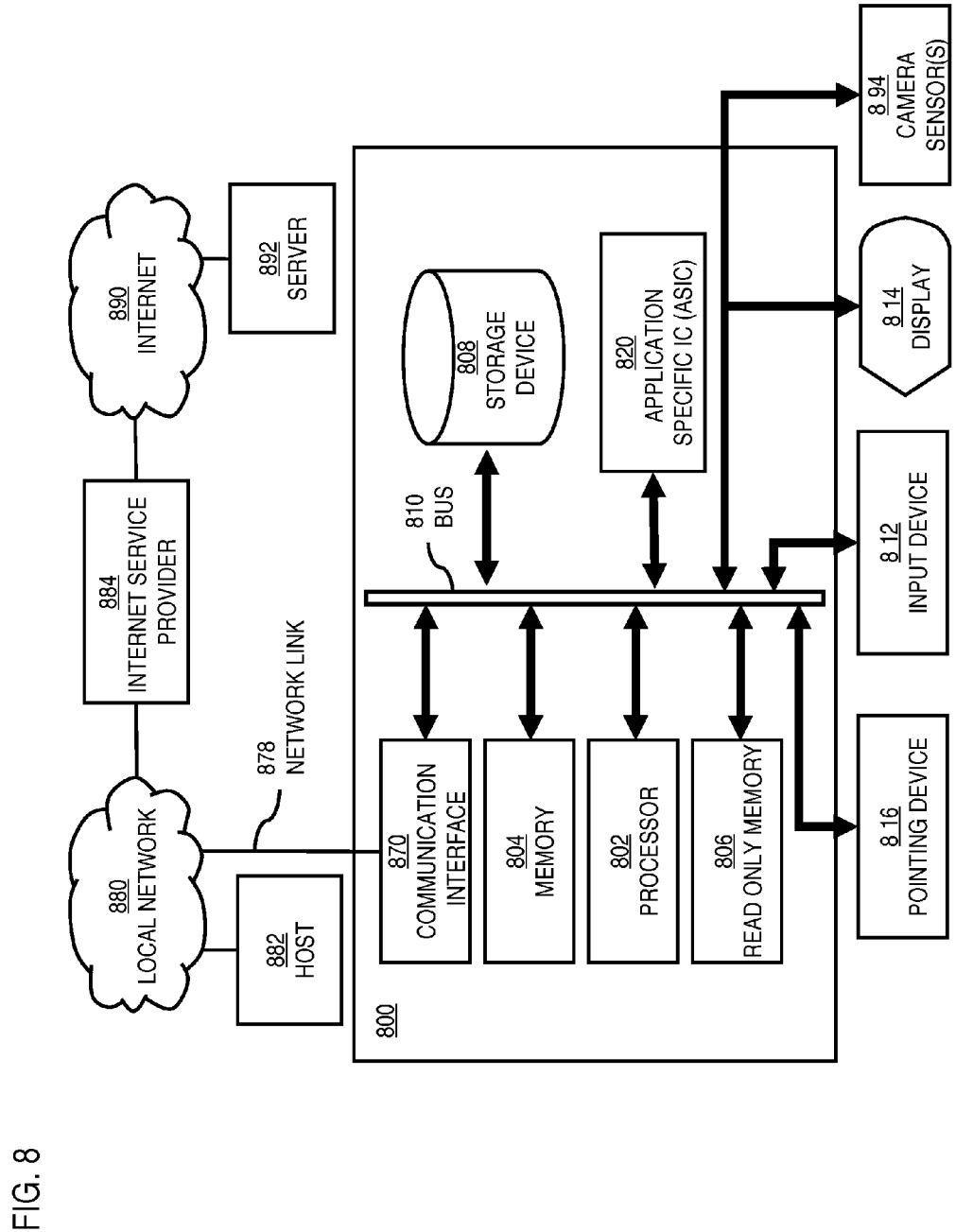
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to provide hub-based indexing and services as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of providing hub-based indexing and services.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to providing hub-based indexing and services. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR(XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 800 also includes a memory 804 coupled to bus 810. The memory 804, such as a random access memory (RAM) or any other dynamic storage device, stores information including processor instructions for providing hub-based indexing and services. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing hub-based indexing and services, is provided to the bus 810 for use by the processor from an external input device 812, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814, and one or more camera sensors 894 for capturing, recording and causing to store one or more still and/or moving images (e.g., videos, movies, etc.) which also may comprise audio recordings. In some embodiments, for example, in embodiments in which the computer system 800 performs all functions automatically without human input, one or more of external input device 812, display device 814 and pointing device 816 may be omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for providing hub-based indexing and services to the UE 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to provide hub-based indexing and services as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip.

It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of providing hub-based indexing and services.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide hub-based indexing and services. The memory 905 also stores the data associated with or generated by the execution of the inventive steps.

Figure 10:
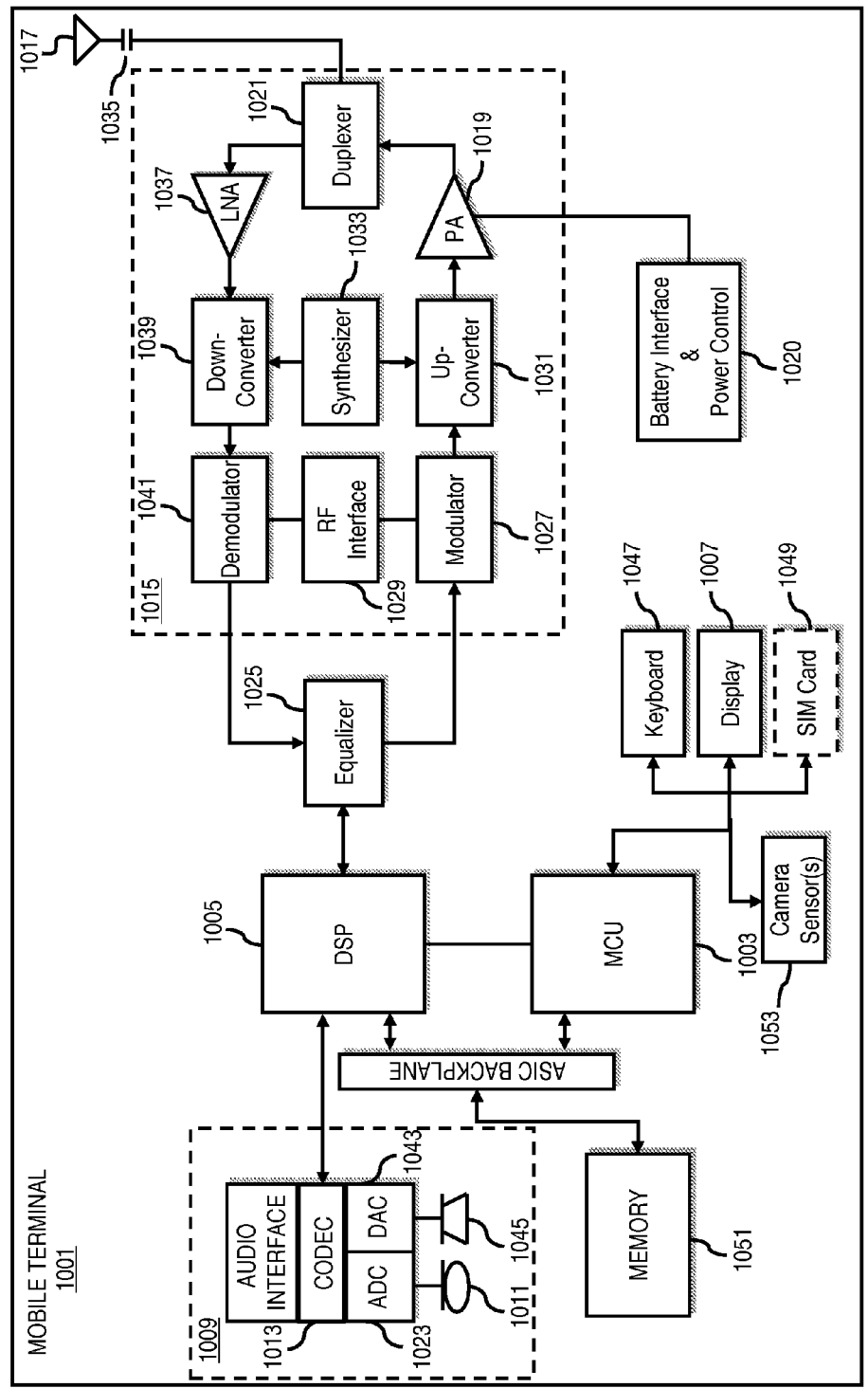
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of providing hub-based indexing and services. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of providing hub-based indexing and services. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to provide hub-based indexing and services. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

Further, one or more camera sensors 1053 may be incorporated onto the mobile station 1001 wherein the one or more camera sensors may be placed at one or more locations on the mobile station. Generally, the camera sensors may be utilized to capture, record and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:
1. A method comprising:
indexing location-based content according to one or more location hubs of one or more transportation lines;
determining a current proximity, a predicted proximity, or a combination thereof of one or more devices to the one or more location hubs, wherein the one or more devices are (a) traveling on the one or more transportation lines, (b) predicted to travel on the one or more transportation lines, or (c) a combination thereof;
presenting at least a portion of the location-based content based, at least in part, on the current proximity, the predicted proximity, or a combination thereof; and
determining history information relating to prior traveling associated with the one or more devices and the one or more transportation lines,
wherein the history information comprises how frequently the one or more devices utilize a particular transportation line, how frequently the one or more devices utilize the one or more location hubs for departure, and time of day the one or more devices utilize the one or more transportation lines or the one or more hubs, and
wherein the determination of the current proximity, the predicted proximity, or a combination thereof is based, at least in part, on the history information.
2. A method of claim 1, further comprising:
processing sensor information associated with the one or more devices to determine the current proximity, the predicted proximity, or a combination thereof.
3. A method of claim 1, further comprising:
determining scheduling information associated with the one or more transportation lines, wherein the determination of the current proximity, the predicted proximity, or a combination thereof is based, at least in part, on the scheduling information.

4. A method of claim 1, further comprising:
transmitting the current proximity, the predicted proximity, or a combination thereof to the one or more devices, one or more merchants, one or more promoters, one or more service providers, or a combination thereof.

5. A method of claim 1, further comprising:
determining contextual information associated with the one or more devices, the one or more location hubs, the one or more transportation lines, or a combination thereof,
wherein the determination of the current proximity, the predicted proximity, or a combination thereof is based, at least in part, on the contextual information.

6. A method of claim 1, wherein one or more users of the one or more devices are riding public transportation, the method further comprising:
determining one or more selections by the one or more users relating to the portion of the location-based content by one or more users associated with the one or more devices; and
presenting a notification relating to the portion of the location-based content based, at least in part, on the one or more selections by the one or more users,
wherein the presentation of the portion of the location-based content includes, at least in part, the notification, and
wherein the notification comprises a reminder to the one or more users to exit the public transportation when the one or more users are within a predetermined proximity threshold of the location-based content corresponding to the one or more selection by the one or more users.

7. A method of claim 1, further comprising:
determining feedback information associated with the one or more location hubs, the one or more transportation lines, or a combination thereof from the one or more devices; and
processing the feedback information to cause, at least in part, a classification relating to the one or more location hubs, the one or more transportation lines, or a combination thereof based, at least in part, on the current proximity, the predicted proximity, or a combination thereof.

8. A method of claim 1, wherein the location-based content relates, at least in part, to one or more places of interest, one or more events, one or more recommendations, one or more advertisements, one or more users associated with the one or more devices, one or more statuses, or a combination thereof.

9. A method of claim 1, wherein the one or more location hubs, the one or more transportation lines, or a combination thereof are associated with public transportation.

10. An apparatus comprising:
at least one processor; and
at least one memory including computer program code for one or more programs,
the at least one memory and the computer program code configured to, with the at least one processor, cause the apparatus to perform at least the following,
cause, at least in part, an indexing of location-based content according to one or more location hubs of one or more transportation lines;
determine a current proximity, a predicted proximity, or a combination thereof of one or more devices to the one or more location hubs, wherein the one or more devices are (a) traveling on the one or more transportation lines, (b) predicted to travel on the one or more transportation lines, or (c) a combination thereof;
cause, at least in part, a presentation of at least a portion of the location-based content based, at least in part, on the current proximity, the predicted proximity, or a combination thereof; and
determine history information relating to prior traveling associated with the one or more devices and the one or more transportation lines,
wherein the history information comprises how frequently the one or more devices utilize a particular transportation line, how frequently the one or more devices utilize the one or more location hubs for departure, and time of day the one or more devices utilize the one or more transportation lines or the one or more hubs, and
wherein the determination of the current proximity, the predicted proximity, or a combination thereof is based, at least in part, on the history information.

11. An apparatus of claim 10, wherein the apparatus is further caused to:
process sensor information associated with the one or more devices to determine the current proximity, the predicted proximity, or a combination thereof.

12. An apparatus of claim 10, wherein the apparatus is further caused to:
determine scheduling information associated with the one or more transportation lines,
wherein the determination of the current proximity, the predicted proximity, or a combination thereof is based, at least in part, on the scheduling information.

13. An apparatus of claim 10, wherein the apparatus is further caused to:
cause, at least in part, a transmission of the current proximity, the predicted proximity, or a combination thereof to the one or more devices, one or more merchants, one or more promoters, one or more service providers, or a combination thereof.

14. An apparatus of claim 10, wherein the apparatus is further caused to:
determine contextual information associated with the one or more devices, the one or more location hubs, the one or more transportation lines, or a combination thereof,
wherein the determination of the current proximity, the predicted proximity, or a combination thereof is based, at least in part, on the contextual information.

15. An apparatus of claim 10,
wherein one or more users of the one or more devices are riding public transportation, and
wherein the apparatus is further caused to:
determine one or more selections by the one or more users relating to the portion of the location-based content by one or more users associated with the one or more devices; and
cause, at least in part, presentation of a notification relating to the portion of the location-based content based, at least in part, on the one or more selections by the one or more user,
wherein the presentation of the portion of the location-based content includes, at least in part, the notification, and
wherein the notification comprises a reminder to the one or more users to exit the public transportation when the one or more users are within a predetermined proximity threshold of the location-based content corresponding to the one or more selection by the one or more users.

16. An apparatus of claim 10, wherein the apparatus is further caused to:

determine feedback information associated with the one or more location hubs, the one or more transportation lines, or a combination thereof from the one or more devices; and process the feedback information to cause, at least in part, a classification relating to the one or more location hubs, the one or more transportation lines, or a combination thereof based, at least in part, on the current proximity, the predicted proximity, or a combination thereof.

17. An apparatus of claim 10, wherein the location-based content relates, at least in part, to one or more places of interest, one or more events, one or more recommendations, one or more advertisements, one or more users associated with the one or more devices, one or more statuses, or a combination thereof.

18. An apparatus of claim 10, wherein the one or more location hubs, the one or more transportation lines, or a combination thereof are associated with public transportation.

19. A non-transitory computer-readable storage medium carrying one or more sequences of one or more instructions which, when executed by one or more processors, cause an apparatus to at least perform the steps of:

causing, at least in part, an indexing of location-based content according to one or more location hubs of one or more transportation lines;

determining a current proximity, a predicted proximity, or a combination thereof of one or more devices to the one or more location hubs, wherein the one or more devices are (a) traveling on the one or more transportation lines, (b) predicted to travel on the one or more transportation lines, or (c) a combination thereof;

causing, at least in part, a presentation of at least a portion of the location-based content based, at least in part, on the current proximity, the predicted proximity, or a combination thereof;

determining history information relating to prior traveling associated with the one or more devices and the one or more transportation lines, wherein the history information comprises how frequently the one or more devices utilize a particular transportation line, how frequently the one or more devices utilize the one or more location hubs for departure, and time of day the one or more devices utilize the one or more transportation lines or the one or more hubs, and wherein the determination of the current proximity, the predicted proximity, or a combination thereof is based, at least in part, on the history information.

* * * * *